United States Patent
Cannon

(10) Patent No.: US 8,985,622 B1
(45) Date of Patent: Mar. 24, 2015

(54) PERSONAL PROTECTION ASSEMBLY

(71) Applicant: Winnie Cannon, Anna, TX (US)

(72) Inventor: Winnie Cannon, Anna, TX (US)

( * ) Notice: Subject to any disclaimer, the term of this patent is extended or adjusted under 35 U.S.C. 154(b) by 0 days.

(21) Appl. No.: 14/152,224

(22) Filed: Jan. 10, 2014

(51) Int. Cl.
*B60N 2/48* (2006.01)
*B60R 21/207* (2006.01)
*B60R 21/231* (2011.01)

(52) U.S. Cl.
CPC ............ *B60R 21/231* (2013.01); *B60R 21/207* (2013.01); *B60N 2/4882* (2013.01); *B60R 2021/23146* (2013.01); *B60R 2021/2074* (2013.01); *B60N 2/4808* (2013.01)
USPC ........................................ 280/730.2; 297/391

(58) Field of Classification Search
CPC ............... B60R 2021/2074; B60R 2021/0006; B60R 2021/23146; B60R 2021/23107; B60N 2/4882; B60N 2/2872; B60N 2/4808; B60N 2/449; B64D 2011/061; B64D 2011/0668
USPC ............................ 280/730.2, 730.1; 297/391
See application file for complete search history.

(56) References Cited

U.S. PATENT DOCUMENTS

| | | | |
|---|---|---|---|
| 4,114,214 A | 9/1978 | VonHeck | |
| 4,205,878 A * | 6/1980 | Wooten | 297/391 |
| D298,986 S | 12/1988 | Carter | |
| D325,144 S | 4/1992 | Mason | |
| 5,218,910 A | 6/1993 | Mesmer et al. | |
| 5,822,707 A | 10/1998 | Breed et al. | |
| 5,904,405 A * | 5/1999 | Wu | 297/391 |
| 6,120,099 A * | 9/2000 | Reiker.ang.s et al. | 297/391 |
| 6,158,812 A * | 12/2000 | Bonke | 297/391 |
| 6,199,900 B1 | 3/2001 | Zeigler | |
| 6,299,197 B1 * | 10/2001 | Mueller | 280/728.3 |
| 6,692,071 B2 * | 2/2004 | Fowler | 297/216.12 |
| 7,055,904 B2 | 6/2006 | Skelly et al. | |
| 7,145,263 B2 | 12/2006 | Nathan et al. | |
| 7,369,928 B2 | 5/2008 | Wang et al. | |
| 7,631,935 B2 * | 12/2009 | Chen et al. | 297/284.9 |
| 7,717,459 B2 * | 5/2010 | Bostrom et al. | 280/730.1 |
| 8,820,830 B2 * | 9/2014 | Lich et al. | 297/216.13 |
| 2002/0000742 A1 | 1/2002 | Wato et al. | |
| 2006/0043777 A1 * | 3/2006 | Friedman et al. | 297/216.13 |
| 2012/0089303 A1 * | 4/2012 | Freienstein et al. | 701/45 |

FOREIGN PATENT DOCUMENTS

| | | | | |
|---|---|---|---|---|
| DE | 4446595 A1 * | 10/1995 | | B60N 2/48 |
| DE | 102011109619 A1 * | 2/2013 | | |
| JP | 2010137666 A * | 6/2010 | | |

* cited by examiner

*Primary Examiner* — Keith Frisby

(57) ABSTRACT

A personal protection assembly for restraining a user's head in a vehicle includes a head rest operationally coupled to a vehicle seat. An upper wing is operationally coupled to the head rest and selectively restrains the user's head. An upper air bag is operationally coupled to the upper wing. A lower wing is operationally coupled to the seat in the vehicle and selectively restrains the user's body. A lower air bag is operationally coupled to the lower wing. An actuator is coupled to the vehicle seat. The actuator is operationally coupled to the upper and lower wings. The actuator selectively actuates the upper and lower wings into the extended position. A sensor is coupled to the vehicle seat. The sensor is operationally coupled to the head rest. The sensor detects the user when the user sits in the vehicle seat. The head rest adjusts to the user.

17 Claims, 4 Drawing Sheets

PERSONAL PROTECTION ASSEMBLY

BACKGROUND OF THE DISCLOSURE

Field of the Disclosure

The disclosure relates to personal protection devices and more particularly pertains to a new personal protection device for restraining a user's head in a vehicle.

SUMMARY OF THE DISCLOSURE

An embodiment of the disclosure meets the needs presented above by generally comprising a head rest operationally coupled to a vehicle seat. An upper wing is operationally coupled to the head rest. The upper wing is selectively positionable in an extended position so the upper wing restrains the user's head. An upper air bag is operationally coupled to the upper wing. The upper air bag selectively deploys. A lower wing is operationally coupled to the seat in the vehicle. The lower wing is selectively positionable in an extended position so the lower wing restrains the user's body. A lower air bag is operationally coupled to the lower wing. The lower air bag selectively deploys. An actuator is coupled to the vehicle seat. The actuator is operationally coupled to the upper and lower wings. The actuator selectively actuates the upper and lower wings into the extended position. A sensor is coupled to the vehicle seat. The sensor is operationally coupled to the head rest. The sensor detects the user when the user sits in the vehicle seat. The head rest adjusts to the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
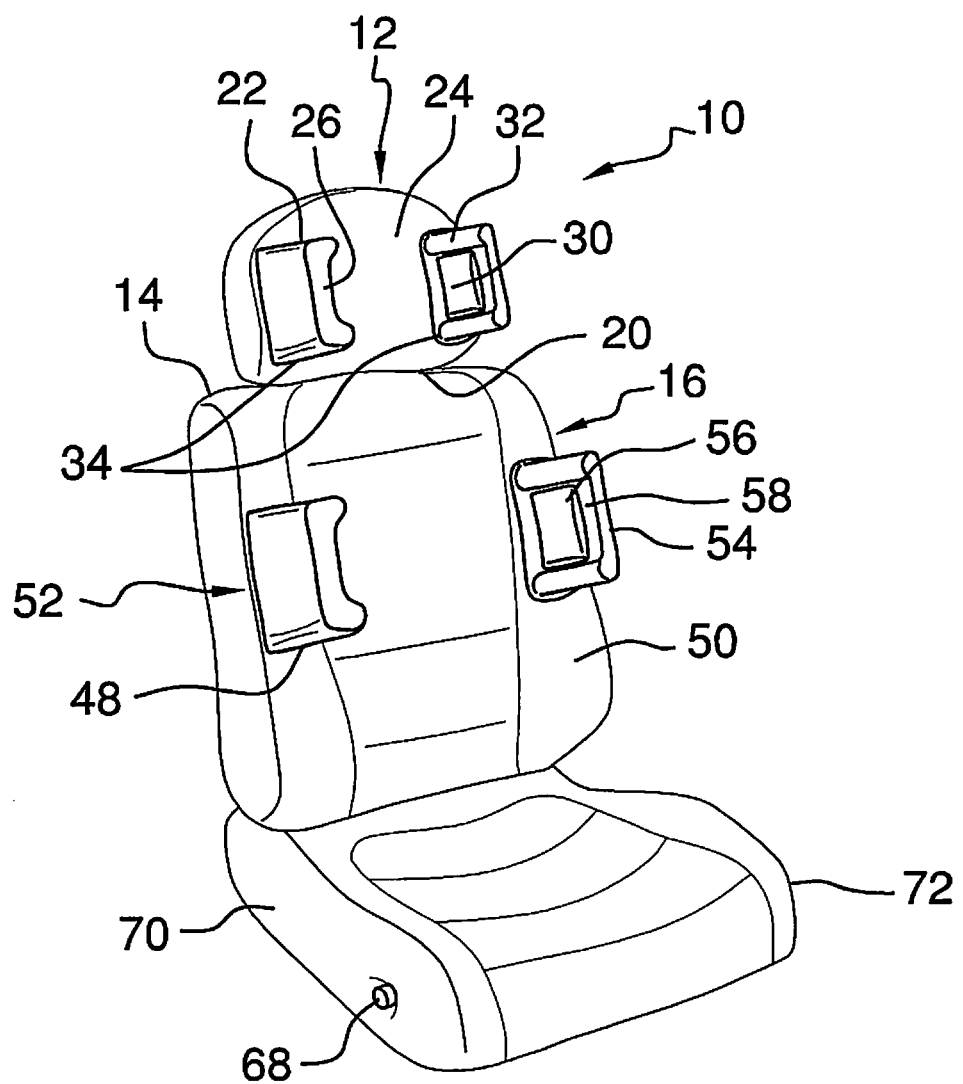
FIG. 1 is a front perspective view of a personal protection assembly according to an embodiment of the disclosure.
Figure 2:
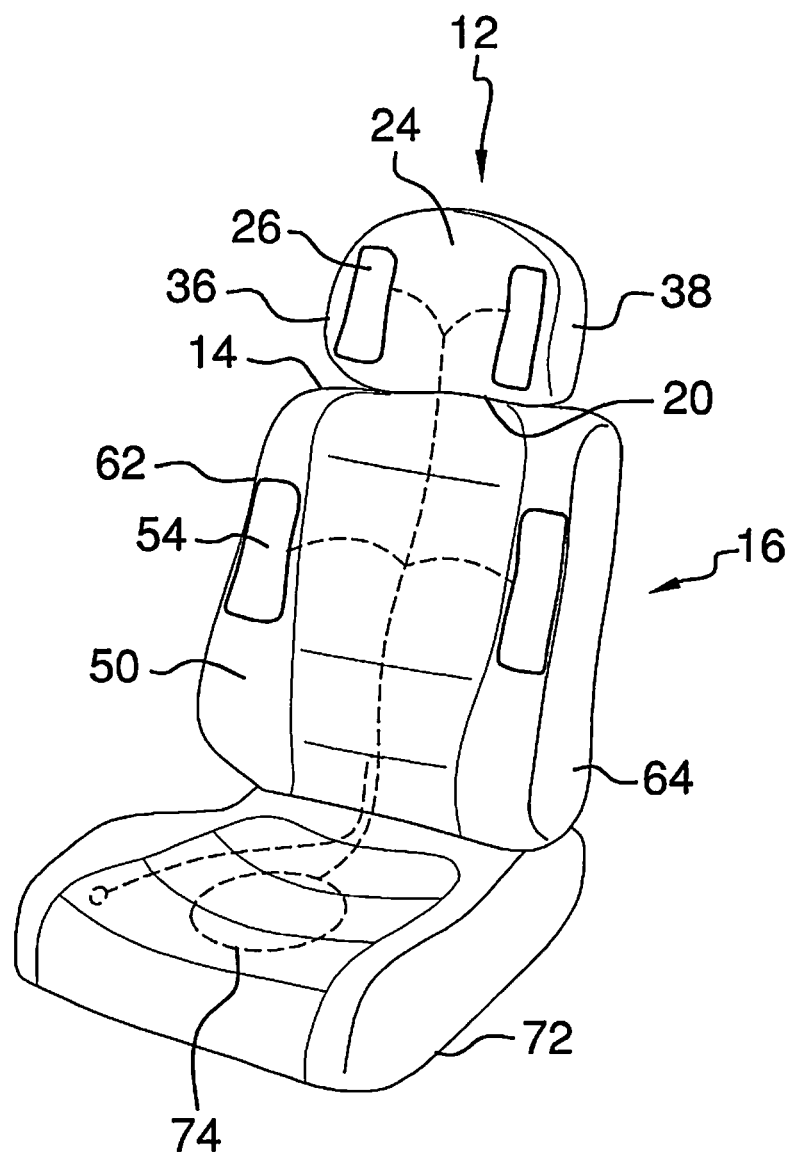
FIG. 2 is a left side perspective view of an embodiment of the disclosure.
Figure 3:
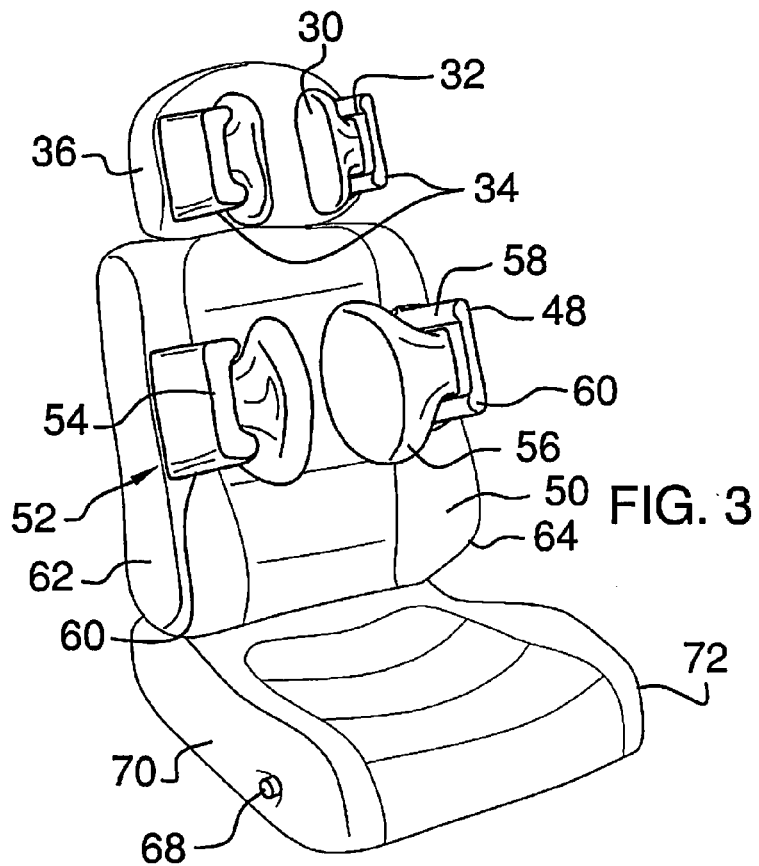
FIG. 3 is a right side perspective view of an embodiment of the disclosure.
Figure 4:
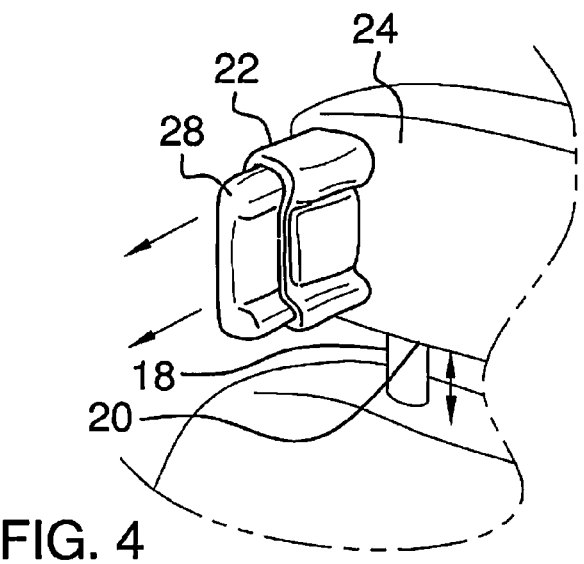
FIG. 4 is a perspective view of an embodiment of the disclosure.
Figure 5:
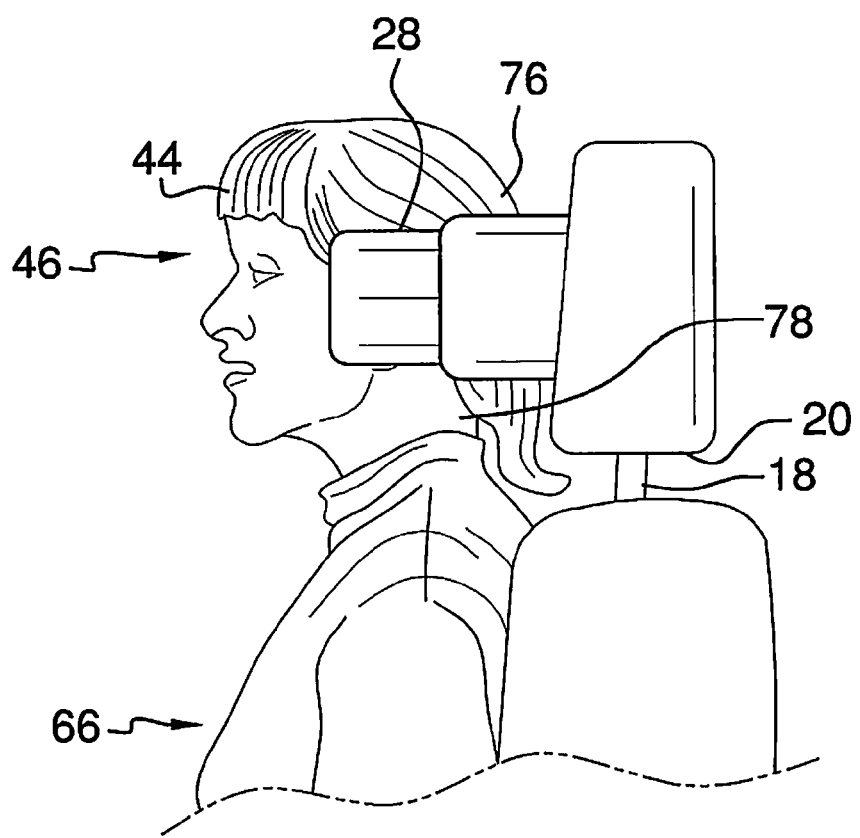
FIG. 5 is an in-use view of an embodiment of the disclosure.

With reference now to the drawings, and in particular to FIGS. 1 through 5 thereof, a new personal protection device embodying the principles and concepts of an embodiment of the disclosure and generally designated by the reference numeral 10 will be described.

As best illustrated in FIGS. 1 through 5, the personal protection assembly 10 generally comprises a head rest 12 movably coupled to a top side 14 of a vehicle seat 16. Moreover, the vehicle seat 16 may be a vehicle seat 16 of any conventional design. A pair of rods 18 extends between a bottom side 20 of the head rest 12 and the top side 14 of the vehicle seat 16. The head rest 12 is positionable at a selected height with respect to the top side 14 of the vehicle seat 16.

An upper wing 22 is slidably coupled to a front side 24 of the head rest 12. The upper wing 22 extends forwardly from the front side 24 of the head rest 12 when the upper wing 22 is positioned in an extended position. Further, a front side 26 of the upper wing 22 is aligned with the front side 24 of the head rest 12 when the upper wing 22 is positioned in a retracted position. An extension portion 28 of the upper wing 22 is slidably coupled to the front side 26 of the upper wing 22. The extension portion 28 of the upper wing 22 is selectively extended forwardly from the front side 26 of the upper wing 22.

An upper air bag 30 is movably coupled to an interior side 32 of the upper wing 22. The upper air bag 30 is electrically coupled to the vehicle's crash detection system. Moreover, the upper air bag 30 is selectively inflated by the vehicle's crash detection system. The upper air bag 30 may be a vehicle air bag of any conventional design.

The upper wing 22 is one of a pair of the upper wings 34. Each of the pair of upper wings 34 is positioned proximate an associated one of a first lateral side 36 and a second lateral side 38 of the headrest 12. Each of the pair of upper wings 34 is positioned proximate opposite sides of the user's head 44 when the pair of upper wings 34 is positioned in the extended position. The pair of upper wings 34 prevents the user's head 44 from tipping if the user 46 chooses to sleep.

A lower wing 48 is slidably coupled to a front side 50 of the vehicle seat 16 proximate a middle 52 of the vehicle seat 16. The lower wing 48 extends forwardly from the front side 50 of the vehicle seat 16 when the lower wing 48 is positioned in an extended position. Additionally, a front side 54 of the lower wing 48 is aligned with the front side 50 of the vehicle seat 16 when the lower wing 48 is positioned in a retracted position.

A lower air bag 56 is movably coupled to an interior side 58 of the lower wing 48. The lower air bag 56 is electrically coupled to the vehicle's crash detection system. Moreover, the lower air bag 56 is selectively inflated by the vehicle's crash detection system. The lower air bag 56 may be a vehicle air bag of any conventional design.

The lower wing 48 is one of a pair of the lower wings 60. Each of the pair of lower wings 60 is positioned proximate an associated one of a first lateral side 62 and a second lateral side 64 of the vehicle seat 16. Additionally, each of the pair of lower wings 60 is positioned proximate opposite sides of the user's torso 66 when the pair of lower wings 60 is positioned in the extended position. The pair of lower wings 60 keeps the user's torso 66 in an upright position if the user 46 chooses to sleep.

An actuator 68 is coupled to the vehicle seat 16. The actuator 68 is positioned on a first lateral side 70 of a seat portion 72 of the vehicle seat 16. Additionally, the actuator 68 is electrically coupled to each of the pairs of upper 34 and lower 60 wings. The actuator 68 selectively actuates each of the pair of upper 34 and lower 60 wings between the extended position and the retracted position.

A sensor 74 is coupled to the seat portion 72 of the vehicle seat 16. The sensor 74 detects a weight of the user 46 when the user 46 sits in the vehicle seat 16. Further, the sensor 74 may be a weight sensor of any conventional design. Additionally, the sensor 74 is electrically coupled between the headrest 16 and the vehicle electrical system. The head rest 16 is actuated either upwardly or downwardly so a back 76 of the user's head 44 abuts the front side 24 of the head rest 12.

In use, the user 46 actuates the actuator 68 when the user 46 wishes to sleep in the vehicle seat 16. The pair of upper wings 34 prevents cramping in the user's neck 78 while the user 46 sleeps. Additionally, the user 46 extends the extension portion 28 of each of the pair of upper wings 34 in order to provide shade from the sun. The user 46 may retract the extension portion 28 of each of the pair of upper wings 34 at any time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal protection assembly for restraining a user's head in a vehicle, said assembly comprising:
    a head rest operationally coupled to a vehicle seat;
    an upper wing operationally coupled to said head rest, said upper wing being selectively positionable in an extended position wherein said upper wing restrains the user's head;
    an upper air bag operationally coupled to said upper wing wherein said upper air bag selectively deploys;
    a lower wing operationally coupled to the seat in the vehicle, said lower wing being selectively positionable in an extended position wherein said lower wing restrains the user's body;
    a lower air bag operationally coupled to said lower wing wherein said lower air bag selectively deploys;
    an actuator coupled to the vehicle seat, said actuator being operationally coupled to said upper and lower wings wherein said actuator selectively actuates said upper and lower wings into said extended position; and
    a sensor coupled to the vehicle seat, said sensor being operationally coupled to said head rest, said sensor detecting the user when the user sits in the vehicle seat wherein said head rest adjusts to the user.

2. The assembly according to claim 1 further comprising said head rest being movably coupled to a top side of the vehicle seat.

3. The assembly according to claim 1 further comprising a pair of rods extending between a bottom side of said head rest and a top side of the vehicle seat wherein said head rest is positionable at a selected height with respect to the top side of the vehicle seat.

4. The assembly according to claim 1 further comprising said upper wing being slidably coupled to a front side of said head rest wherein said upper wing extends forwardly from said front side of head rest when said upper wing is positioned in said extended position.

5. The assembly according to claim 1 further comprising said upper wing being one of a pair of said upper wings.

6. The assembly according to claim 5 further comprising each of said pair of upper wings being positioned proximate an associated one of a first lateral side and a second lateral side of said headrest wherein each of said pair of upper wings is positioned proximate an associated one of a first lateral side and a second lateral side of the user's head when said pair of upper wings is positioned in said extended position.

7. The assembly according to claim 1 further comprising said upper air bag being movably coupled to an interior side of said upper wing.

8. The assembly according to claim 1 further comprising said upper air bag being electrically coupled to the vehicle's crash detection system wherein said upper air bag is selectively inflated by the vehicle's crash detection system.

9. The assembly according to claim 1 further comprising said lower wing being slidably coupled to a front side of the vehicle seat proximate a middle of the vehicle seat wherein said lower wing extends forwardly from the front side of the vehicle seat when said lower wing is positioned in said extended position.

10. The assembly according to claim 1 further comprising said lower wing being one of a pair of said lower wings.

11. The assembly according to claim 10 further comprising each of said pair of lower wings being positioned proximate an associated one of a first lateral side and a second lateral side of the vehicle seat wherein each of said pair of lower wings is positioned proximate an associated one of a first lateral side and a second lateral side of the user's torso when said pair of lower wings is positioned in said extended position.

12. The assembly according to claim 1 further comprising said lower air bag being movably coupled to an interior side of said lower wing.

13. The assembly according to claim 1 further comprising said lower air bag being electrically coupled to the vehicle's crash detection system wherein said lower air bag is selectively inflated by the vehicle's crash detection system.

14. The assembly according to claim 1 further comprising said actuator being electrically coupled to each of said upper and lower wings.

15. The assembly according to claim 1 further comprising said sensor being coupled to a seat portion of the vehicle seat wherein the sensor detects a weight of the user.

16. The assembly according to claim 1 further comprising said sensor being electrically coupled to said headrest.

17. A personal protection assembly for restraining a user's head in a vehicle, said assembly comprising:
    a head rest movably coupled to a top side of a vehicle seat;
    a pair of rods extending between a bottom side of said head rest and the top side of the vehicle seat wherein said head rest is positionable at a selected height with respect to the top side of the vehicle seat;
    an upper wing slidably coupled to a front side of said head rest wherein said upper wing extends forwardly from said front side of head rest when said upper wing is positioned in an extended position;

an upper air bag movably coupled to an interior side of said upper wing, said upper air bag being electrically coupled to the vehicle's crash detection system wherein said upper air bag is selectively inflated by the vehicle's crash detection system;

said upper wing being one of a pair of said upper wings, each of said pair of upper wings being positioned proximate an associated one of a first lateral side and a second lateral side of said headrest wherein each of said pair of upper wings is positioned proximate an associated one of a first lateral side and a second lateral side of the user's head when said pair of upper wings is positioned in said extended position;

a lower wing slidably coupled to a front side of the vehicle seat proximate a middle of the vehicle seat wherein said lower wing extends forwardly from the front side of the vehicle seat when said lower wing is positioned in an extended position;

a lower air bag movably coupled to an interior side of said lower wing, said lower air bag being electrically coupled to the vehicle's crash detection system wherein said lower air bag is selectively inflated by the vehicle's crash detection system;

said lower wing being one of a pair of said lower wings, each of said pair of lower wings being positioned proximate an associated one of a first lateral side and a second lateral side of the vehicle seat wherein each of said pair of lower wings is positioned proximate an associated one of a first lateral side and a second lateral side of the user's torso when said pair of lower wings is positioned in said extended position;

an actuator coupled to the vehicle seat, said actuator being electrically coupled to each of said upper and lower wings wherein said actuator selectively actuates said upper and lower wings into said extended position; and a sensor coupled to a seat portion of the vehicle seat wherein the sensor detects a weight of the user when the user sits in the vehicle seat wherein said head rest adjusts to the user, said sensor being electrically coupled to said headrest.

\* \* \* \* \*